United States Patent

[11] 3,577,108

| [72] | Inventors | Waldemar Bengtson;<br>Orvar Dahle, Vasteras, Sweden |
|---|---|---|
| [21] | Appl. No. | 855,922 |
| [22] | Filed | Sept. 8, 1969 |
| [45] | Patented | May 4, 1971 |
| [73] | Assignee | Allmanna Svenska Elektriska Aktiebolaget<br>Vasteras, Sweden |
| [32] | Priority | Sept. 10, 1968 |
| [33] | | Sweden |
| [31] | | 12124/68 |

[54] ANNULAR MAGNETOELASTIC TRANSDUCER
2 Claims, 4 Drawing Figs.
[52] U.S. Cl................................................ 336/20,
73/141, 310/26, 335/3, 335/215, 336/213
[51] Int. Cl....................................................... H01f 21/02
[50] Field of Search............................................ 336/20,
213; 310/26; 73/133 (B), 141 (A); 335/3, 215;
324/24

[56] References Cited
UNITED STATES PATENTS
| 2,879,496 | 3/1959 | Camp.......................... | 310/26X |
| 3,406,302 | 10/1968 | Lanyi et al.................. | 310/26 |
| 3,483,743 | 12/1969 | Woods ....................... | 336/20 |

*Primary Examiner*—Thomas J. Kozma
*Attorney*—Jennings Bailey, Jr.

ABSTRACT: An annular magnetoelastic transducer has a core in the shape of a cylindrical ring. The core is manufactured by winding a striplike magnetostrictive material so that the plane of the strip is parallel to the central axis of the ring. In the core is a number of holes which are arranged substantially radially through the core. The holes are arranged in groups which are evenly distributed around the circumference of the core. In the holes there is a winding connected to a current source for generating a magnetic flux in the core and a winding connected to a measuring device for indicating the alterations of the magnetic flux which appears when the core is subjected to mechanical forces.

PATENTED MAY 4 1971 3,577,108

INVENTORS
WALDEMAR BENGTSON
ORVAR DAHLE
BY
Jennings Bailey Jr

ANNULAR MAGNETOELASTIC TRANSDUCER

BACKGROUND OF THE INVENTION

1. Field of the Invention

The present invention relates to an annular magnetoelastic transducer for converting a pressure to a corresponding electric signal.

SUMMARY OF THE DISCLOSURE

The transducer according to the invention comprises a core of magnetostrictive material which is provided with windings to generate a magnetic flux in the core and to sense the flux alterations arising in the core when this is subjected to mechanical pressure. The invention is characterized in that the core is wound helically from striplike material so that the core has the shape of a cylindrical ring, the plane of the strip being parallel to the central axis of the ring and in that the windings are arranged in holes which are arranged substantially radially through the core.

A transducer according to the invention is intended to measure the tensile or compressive stresses in preferably cylindrical objects such as shafts, bolts, and the like. One particular field of use is the measurement of roller pressure in rolling mills where the transducer is placed around the top screw or around the screws which press the upper and lower bearing housings together, the transducer being arranged so that it is subjected to the force with which the rollers are pressed together.

BRIEF DESCRIPTION OF THE DRAWINGS

In the accompanying drawings FIG. 3 shows a section along the line III–III in FIG. 2, while

DESCRIPTION OF THE PREFERRED EMBODIMENTS

Figure 1:
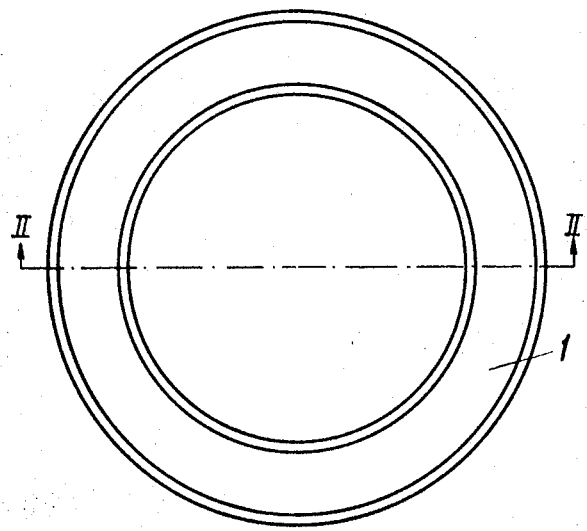
FIG. 1 shows the transducer screen along its central axis.
Figure 2:
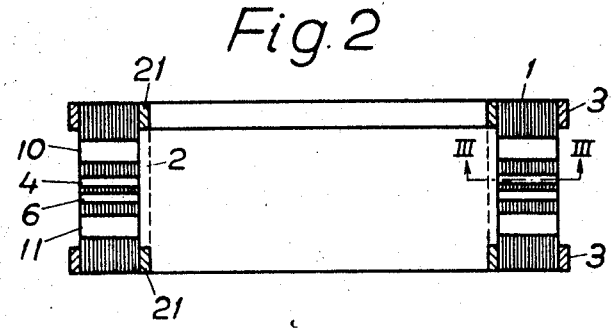
FIG. 2 shows a section along the line II–II in FIG. 1.
Figure 4:
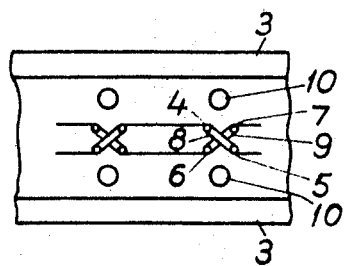
FIG. 4 shows a part of the transducer seen from the side.

The transducer according to the invention is manufactured by winding a striplike magnetostrictive material helically so that a cylindrical, preferably circular ring 1 is formed. The width of the strip is equal to the height of the finished transducer, as can be seen in FIG. 2. The strip is wound onto a frame 2 which determines the inner diameter of the transducer and its shape. The outer end of the strip is secured, for example, by means of point welding. In order to hold the core together two outer rings 3 and 4 are applied, which are suitably shrunk onto the core and possibly attached by means of welding. Several holes are made in the core for the windings which are to generate a magnetic field in the core and sense the flux alterations which arise when the core is subjected to mechanical pressure. According to a preferred embodiment the holes are positioned in groups of four as seen in FIG. 4 where the winding holes are designated 4, 5, 6 and 7. The core is provided with a number of such groups of holes distributed evenly around the circumference. Two diagonally opposite holes are arranged to an excitation winding 8 whereas the two other holes are for a measuring winding 9. The excitation windings in the different groups are series connected and connected to an excitation source and in the same way the measuring windings are in series-connection and connected to a conventional measuring device. The shown arrangement of the holes, application of the winding in the holes and series-connection of the windings are well-known principles for magnetoelastic transducers. Above and below the groups of four winding holes are larger holes 10 and 11, respectively, in order to take up a part of the mechanical pressure flux from the measuring zone between the winding holes. These holes thus shunt away a part of the force flux from the measuring zone between the winding holes, which is in itself known.

According to another principle, only two winding holes are arranged in each group and the winding arranged therein is connected to a measuring bridge so that it will operate as an inductance depending on the mechanical stresses acting on the transducer.

When the holes have been bored in the core, the central part of the frame 2 is removed so that the core is exposed at least in the annular zone containing the winding holes. Two rings 21 remain from the frame and are situated at the ends of the core opposite the outer rings 3.

Figure 3:
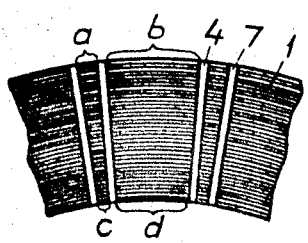

So that the sensitivity of the transducer shall be constant in radial direction, the holes in a circular plane should not be parallel, but should diverge outwardly as is seen in FIG. 3. The divergence should be such that the relationship between the measuring surface between the holes in a group and the merely supporting surface between the groups of holes is equal at the outer and inner edges of the core. Referring to the designations in FIG. 3, therefore $a \cdot d = c$.

In order to facilitate winding and to decrease and equalize the internal mechanical stresses which arise in the finished transducer due to the winding of the strip it is suitable to curve the strip before winding it. A subsequent recovery treatment further reduces the stresses.

At the same time as the strip is being wound a binder is applied which is cured during a subsequent heat treatment of the finished transducer.

We claim:

1. Annular magnetoelastic transducer for converting a pressure to a corresponding electric signal and comprising a core of magnetostrictive material which is provided with windings to generate a magnetic flux in the core and to sense the flux alterations arising in the core when this is subjected to mechanical pressure, said core being wound helically from a striplike material into the shape of a cylindrical ring, the plane of the strip being parallel to the central axis of the ring, said ring having holes arranged substantially radially through the core, said windings being situated in said holes.

2. Transducer according to claim 1, said holes for the windings being arranged in a certain number of groups evenly distributed around the circumference of the core, at least two holes in each group being arranged in the same plane perpendicular to the central axis of the core.